US005186585A

United States Patent [19]

Sousa et al.

[11] Patent Number: 5,186,585

[45] Date of Patent: Feb. 16, 1993

[54] WHEELCHAIR RESTRAINING SYSTEM

[75] Inventors: James E. Sousa, 18 Wheaton Dr., Attleboro, Mass. 02703; Ronald A. Rogers, Foxboro, Mass.; Allen Grota, Attleboro, Mass.

[73] Assignee: James E. Sousa, Attleboro, Mass.

[21] Appl. No.: 679,957

[22] Filed: Apr. 3, 1991

[51] Int. Cl.[5] .................... B60P 7/08

[52] U.S. Cl. .................... 410/9; 188/2 F; 410/22; 296/65.1; 248/503.1; 211/20; 224/311

[58] Field of Search .................... 410/3, 4, 7, 8, 9, 19, 410/22, 30, 47; 414/921; 297/4; 248/503, 503.1; 280/304.1; 24/495, 496; 296/65.1, 68.1; 224/42, 45, 311; 211/17, 19, 70; 188/2 F, 4 R, 5-9, 32

[56] References Cited

U.S. PATENT DOCUMENTS

| | | | |
|---|---|---|---|
| 618,507 | 1/1899 | Henderson et al. | 211/19 X |
| 621,072 | 3/1899 | Gregory | 211/19 X |
| 2,639,813 | 5/1953 | Risvold et al. | 211/19 |
| 3,322,456 | 5/1967 | Strakhal et al. | 24/496 X |
| 4,083,594 | 4/1978 | Tullock | 410/9 X |
| 4,246,984 | 1/1981 | Seay et al. | 410/19 X |
| 4,325,576 | 4/1982 | Guthrie | 296/65.1 |
| 4,407,616 | 10/1983 | Hinze | 410/3 |
| 4,475,762 | 10/1984 | DeLong et al. | 410/19 X |
| 4,588,340 | 5/1986 | Howard | 410/7 |
| 4,716,811 | 1/1988 | Johnson | 24/495 X |
| 4,729,573 | 3/1988 | Davis | 410/7 X |

*Primary Examiner*—David A. Bucci
*Assistant Examiner*—James T. Eller
*Attorney, Agent, or Firm*—John A. Haug

[57] ABSTRACT

A wheelchair security system particularly useful with vehicles used to transport individuals with ambulatory handicaps is shown having a pair of pincer elements for each wheel to be secured. The pincer elements are movable between an open wheel receiving position and a closed wheel securing position. The system is either manually or electrically actuated and can be controlled either at the wheelchair station or the driver's station.

14 Claims, 5 Drawing Sheets

WHEELCHAIR RESTRAINING SYSTEM

BACKGROUND OF THE INVENTION

This invention relates generally to wheelchairs, both manual and motorized, and more specifically to means for securing such chairs in vehicles to ensure safe transport of the chair occupants.

In recent years society has become more and more conscious of the need for providing access for individuals who are not ambulatory for one reason or another to public as well as private and commercial facilities. There has been a dramatic improvement in the ability of such individuals to get out of their dwelling places and into the public. As part of this trend it has also become common to provide transportation for such individuals in their wheelchairs to sundry places, such as shopping malls, doctor's offices, concerts and the like. In order to ensure that such travel is done in a safe manner various wheelchair restraining systems have become available in the market place. Such systems include pin and cam lock types which utilize openings in the wheels of the chair to provide a positive lock. Another system uses a plurality of straps in order secure the wheelchair from several different directions. Still other systems incorporate structure permanently affixed to the chair as a part of the restraining mechanism cooperating with another structural part mounted in a particular vehicle. Due to the proliferation of wheelchair and motorized chairs of different types a need has developed to provide a restaining system which will accommodate a number of different chair types. It is an object of the invention to provide a universal restraining mechanism useful with a wide variety of wheelchair types including wheels having solid centers, wheels with spokes, spoked wheels having spoke guard coverings, smaller than normal wheels, pneumatic wheels, bicycle type wheels, power chairs, scooters, strollers and the like. It is yet another object to provide a system which is either semi or fully automatic in order to reduce the time and effort to properly restrain the chair in a vehicle and to help eliminate the possibility of human error. Another object is the provision of a system which will comply with the various safety codes and is adaptable to different wheelchair types without the use of specialized apparatus bolted or fixed to the chair itself so that it can be used with public transportation.

SUMMARY OF THE INVENTION

Briefly, in accordance with the invention, a pair of pincer elements movable between open and closed positions is provided for each wheel to be secured. According to one embodiment of the invention a wheelchair station has first and second pairs of pincer elements mounted on respective brackets on a bar which is in turn mounted in a vehicle. The pincer elements are pivotably mounted intermediate their ends on the bracket with a spring coupled to a first end of each pincer element urging the pincer elements toward the open position. Each pincer element of a pair has a body portion spaced from one another a selected distance to accommodate the widest wheelchair wheel desired with the opposite or second ends of the pincer elements offset laterally and toward each other so that the distal end portions essentially come together to close a space between the body portions. A force transfer plate is attached to an arm projecting from one pincer element of a pair toward the other and lies along an arm projecting from the other of the pair so that a wheel, when pushed against the force transfer plate will force the first pincer toward the closed position against the bias of the spring and its arm, contacting the arm of the second pincer element, will force it to move to the closed position. A latch member is pivotably attached to the first end of one pincer element and has a free end urged against the first end of the other pincer element. When the force transfer plate is moved backwardly by a wheel the first ends of the pincer elements separate until the free end of the latch member can move beyond the first end of the other pincer element and along its length to limit movement in the opposite direction and maintain the pincer elements in the closed or latched position. A pull cord is attached to the free end of the latch member so that when it is desired to release the restraining mechanism a force is applied to the cord which moves the free end of the latch member beyond the end of the pincer element and allows the spring to open the pincer elements. According to a feature of the invention guide rails are provided to guide wheels of a wheelchair into a position where they can be secured. Stop members are provided on the bracket to maintain the pincer elements in aligned position relative to the guide rails.

According to another embodiment, electrically actuated solenoids are attached to the brackets to apply a force against the latch member to release the mechanism when desired. The solenoid controls can be placed adjacent both the wheelchair station and the driver station.

According to another embodiment normally extended electrically actuated solenoids maintain the pincer elements in the closed position and upon actuation open the pincer elements to allow entry or removal of wheelchair wheels.

The pincer element brackets are received on a transversely extending bar and are laterally adjustable thereon to accommodate wheelchairs having different wheel spacings. The bar is mounted on brackets which can be angularly adjusted to accommodate different diameter wheels so that essentially any type of wheel can be secured.

Various additional objects and advantages of the present invention will become apparent from the following detailed description and accompanying drawings.

BRIEF DESCRIPTION OF THE DRAWINGS

In the accompanying drawings in which several of the preferred embodiments of the invention are illustrated.

Figure 1:
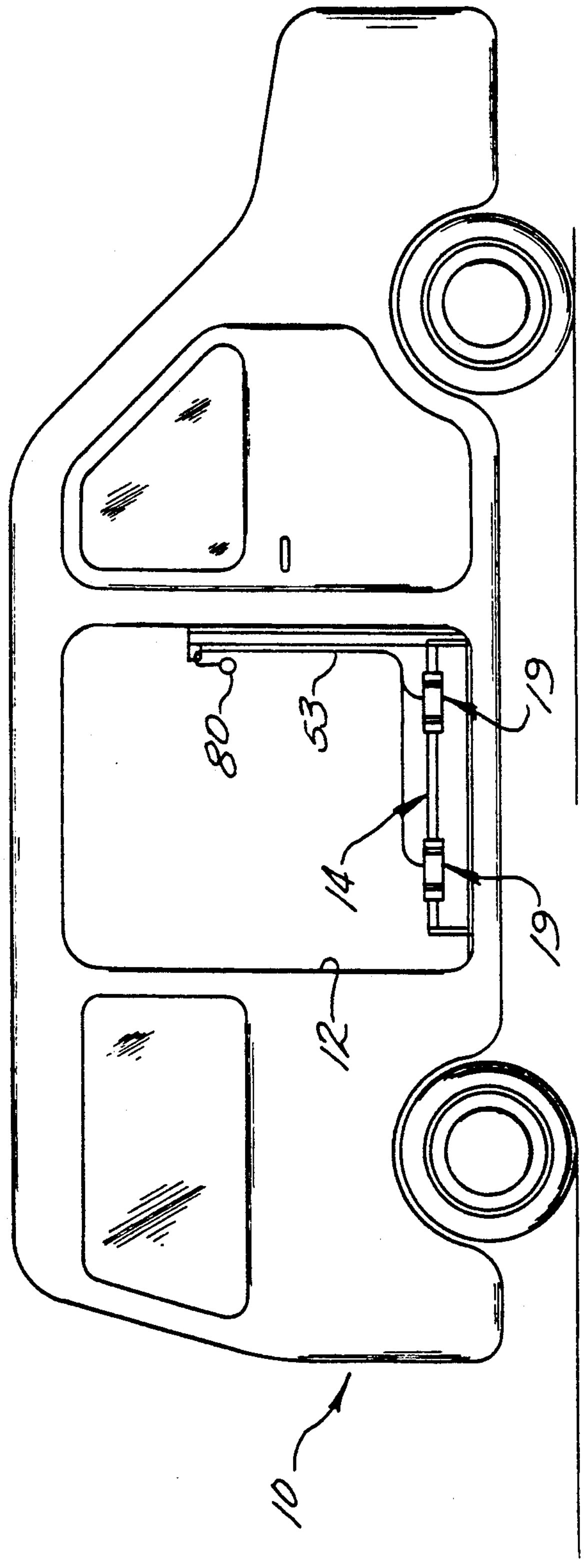
FIG. 1 is a side view of a vehicle with a side door removed for purpose of illustration, with a first embodiment of the invention shown mounted in the vehicle.

Dimensions of certain parts as shown in the drawings may have been modified or exaggerated for the purpose of clarity of illustration.

DESCRIPTION OF PREFERRED EMBODIMENTS

Turning now to the drawings, FIG. 1 shows a typical vehicle 10 with which the invention is employed. Vehicle 10 has a door opening 12 (shown with the door removed for purpose of clarity) and may be provided with a suitable ramp or lift means (not shown) to permit a wheelchair or the like to enter the vehicle. Restraining system 14 is mounted in the vehicle to receive and safely restrain a wheelchair until the chair is selectively released in a convenient manner as will be described below.

Figure 2:
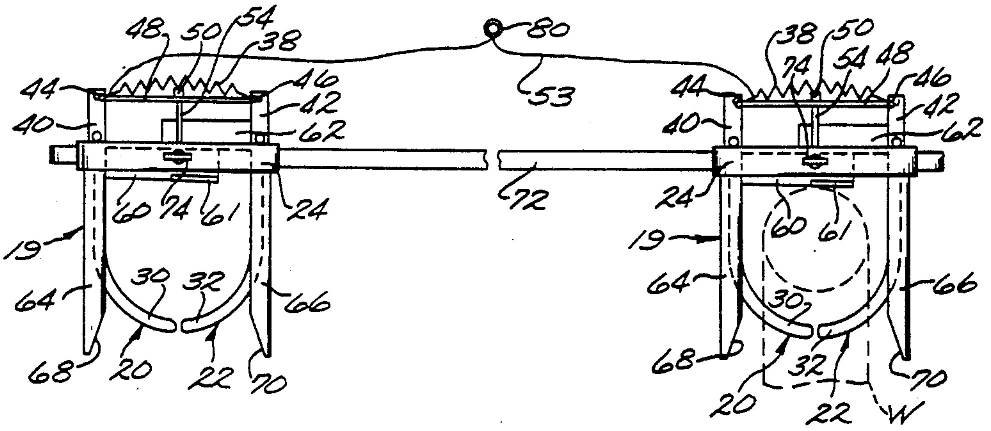
FIGS. 2 and 3 are top views of a mechanically actuated restraining mechanism in the closed and open position respectively.
Figure 3:
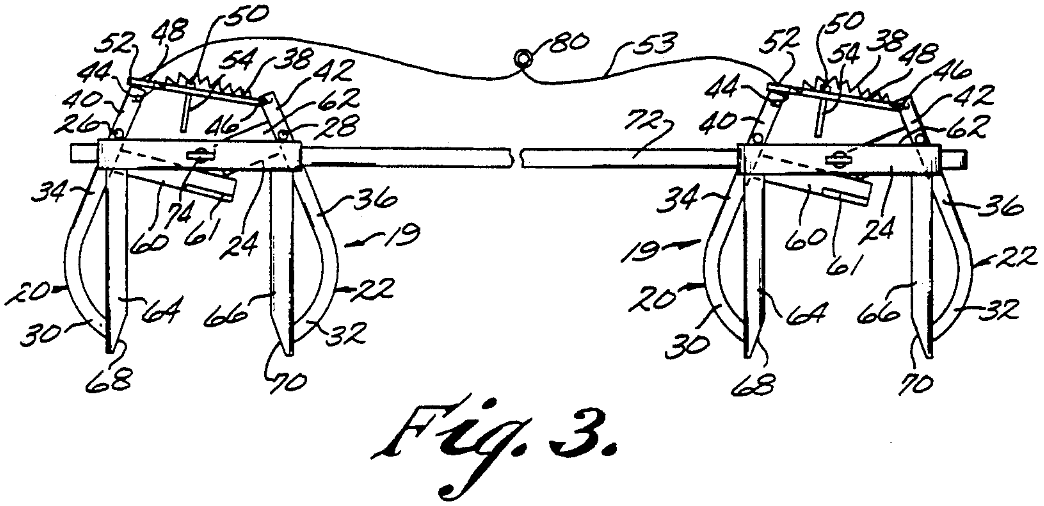

First and second pairs 19 of pincer elements 20, 22 are pivotably mounted intermediate their ends to first and second brackets 24 respectively, and are movable between closed and open positions as shown in FIGS. 2 and 3 respectively. Each pincer element 20, 22 has first and second distal end portions with the second distal end transversely offset relative to its main body portion and extending toward the second distal end of the other pincer element to essentially close the gap therebetween when in the closed position yet still provide a selected spacing between the main body portions. In the preferred embodiments pincers 20, 22 have a free distal end 30, 32 curved inwardly toward one another from main body portions 34, 36 respectively. A conventional spring 38 is attached to the opposite or first ends 40, 42 of the pincer elements in any conventional manner as shown at 44, 46. If desired, additional springs could be connected in parallel to serve as a safety backup in the event that one spring became disconnected or broke. A latch member 48 is pivotably mounted to one of the pincer elements such as at 46 on element 22 and is adapted to butt up against the inside surface of the corresponding end portion 40 of the other pincer element 20.

A stop member 50 is attached to latch member 48 and spring 38 is trained beyond or outboard stop member 50 so that a counterclockwise force is placed on latch member 48 urging the free end 52 of latch member downwardly as seen in FIGS. 2 and 3. Downward motion is limited by leg 54 of stop member 50. Spring 38 also biases ends 40, 42 toward each other urging the pincer elements toward the open FIG. 3 position. A force transmitting means such as a cord 53 is attached to the free end 52 of each latch member for a purpose to be described below.

Force transmitting arm 60 having an upwardly extending force transfer plate 61 is fixedly attached to element 20 adjacent hinge or pivot 26 and projects inwardly toward pincer element 22 generally perpendicular to main body portion 34 and overlaps a corresponding arm 62 fixedly attached to element 22. Arms 60, 62 are offset from one another along the length of the pincer elements so that their outer end portions lie along each other when the pincer elements are in the closed FIG. 2 position. Hinges 26, 28 comprise rods welded to bracket 24 which extend through bores in respective pincers 20, 22. Conventional nuts 27, 29 (FIG. 4) lock the pincer elements to threaded ends of the rods. If desired, a low friction washer of Teflon or the like can be placed between nuts 27, 29 and the pincer elements.

Figure 4:
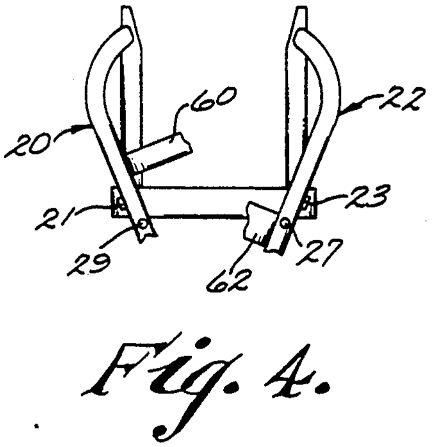
FIG. 4 is a bottom view of a portion of the FIG. 3 mechanism.
Figure 5:
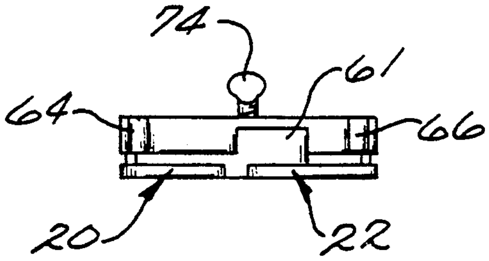
FIGS. 5 and 6 are front and rear views respectively of a portion of the FIG. 1 mechanism.
Figure 6:
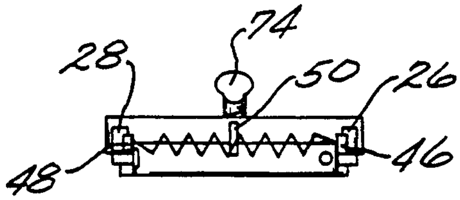

A pair of parallel extending guide rails 64, 66 extend from bracket 24 generally toward the front (downwardly as seen in FIGS. 2 and 3) and preferably are tapered on their outer inside surfaces as seen at 68, 70 respectively to facilitate reception and guidance of a wheel received therebetween. The free distal end 30, 32 of pincer elements 20, 22 in the open position are spaced from one another a distance equal to or greater than the space between guide rails 64, 66 to ensure that they do not interfere with a wheel being received between the guide rails. As seen in FIG. 4, stop elements 21, 23 on the bottom surface of bracket 24 serve to limit outward motion of the pincer elements maintaining them in desired alignment relative to the guide rails.

Brackets 24 are slidingly received on bar 72 and clamped thereto by suitable means such as threaded fasteners 74 so that the brackets can be adjusted to accommodate wheelchairs having different lateral spacing between wheels.

In operation, a wheelchair is rolled backwardly so that its wheels are received between respective pairs of guide rails 68, 70 until the wheels engage force transfer plate 61 of force transmitting arm 60 pushing it backwardly. Arm 60 in turn transmits the rearward force to arm 62 so that both pincer elements 20, 22 are caused to pivot from the open FIG. 3 position to the closed FIG. 2 position. It will be seen that as the pincer elements pivot latch member 48 will ride across the end surface of pincer element 20 until it is free to move downwardly along the inside surface of end portion 40 with its final position being limited by stop member 54 engaging bracket 24, or by the motion of free distal ends 30, 32 being limited by engagement with a wheel clasped between the pincer elements. The configuration of the pincer elements with their free end portions extending transversely toward one another leaving a selected space between the main body portions of the pincer elements is such that the pincer elements extend beyond the widest outer peripheral portion of the wheel to a smaller width portion to provide a positive interference or lock of the wheel which is being grasped. That is, even if the pincer elements are not permitted to reach a fully closed position due to engagement with wheel spoke covers or other support structure of the wheel, the pincer elements will close beyond the widest portion of the wheel so that the pincer elements are adapted to clampingly engage with an interference fit virtually any type of wheel which is placed between the guide rails. Different diameter wheels also can be accommodated as will be described below.

When it is desired to move the wheelchair from its secured position a force is applied to pull ring 80 to dislodge end 52 of latch member 48 from end portion 40 and allow spring 38 to move the pincer elements to their open position. Pull ring 80 can be placed in any desired location, such as adjacent the wheelchair station as shown in FIG. 1, allowing the occupant to release the mechanism. The cord can also be extended to the driver's station so that the mechanism could be released from that position.

Figure 7:
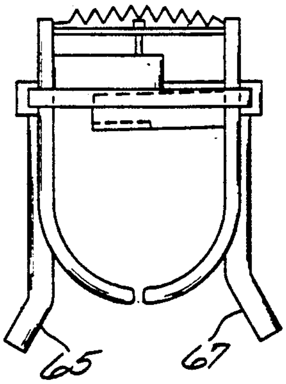
FIG. 7 is a top view of a portion of an alternate embodiment of the invention.

FIG. 7 shows the guide rails 64, 66 modified to flare outwardly at 65, 67 respectively, to facilitate the guidance of a wheelchair into the proper position for securing the chair and are located below the the pincer elements rather than above as shown in FIGS. 2-6 for a purpose to be described below.

Figure 8A:
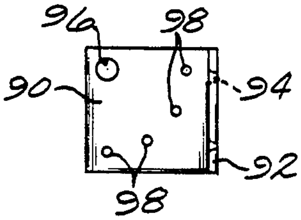
FIGS. 8*a* and 8*b* are side views of brackets used to mount the restraining mechanism in a vehicle.
Figure 8B:
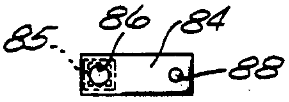
Figure 9:
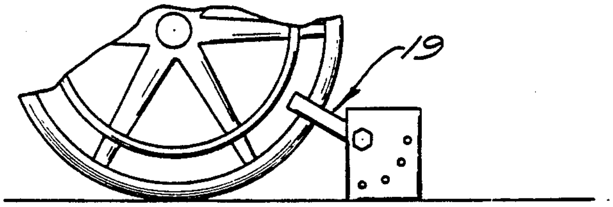
FIGS. 9 and 10 are side views of the restraining mechanism in different angular orientations to accommodate different diameter wheels.
Figure 10:
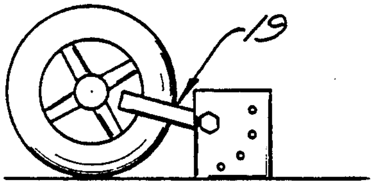

As described supra, brackets 24 are adjustable transversely on bar 72 to any desired position to accommodate wheelchairs having different lateral spacing between their wheels. Bar 72 is preferably non-circular in cross section, such as rectangular, with bracket 24 having a complimentary configured bore receiving bar 72, in order to facilitate angular adjustment of the securing mechanism to accommodate wheels of different diameters. Bar 72 is attached to at least one but preferably at each end to a bracket 84 (FIG. 8*b*) by being welded thereto or by being seated in a rectangular seat 85 fixed relative to the bracket with regard to its angular orientation. It will be appreciated that any other conventional means of fixing it relative to the bracket can be employed. First and second bores 86, 88 are provided in bracket 84 a selected distance from each other. A second pair of brackets 90 (FIG. 8*a*) has a base flange 92 with suitable bores 94 therethrough for attachment to vehicle 10, such as the floor panel or side wall panel. A bore 96 is provided in bracket 90 and is adapted to be aligned with bore 86 of bracket 84 and receive a suitable bolt or the like permitting bracket 84 to swivel. Bore 88 is then aligned with any one of bores 98 to provide a desired angular orientation of the restraining mechanism. Having the guide rails disposed beneath the pincer elements as shown in FIG. 7 results in improved guidance as the mechanism is swiveled upwardly. Generally speaking, it is preferred that the pincer elements and guide rails extend toward the axis of the wheels to be secured, as seen in FIGS. 9 and 10.

Figure 11:
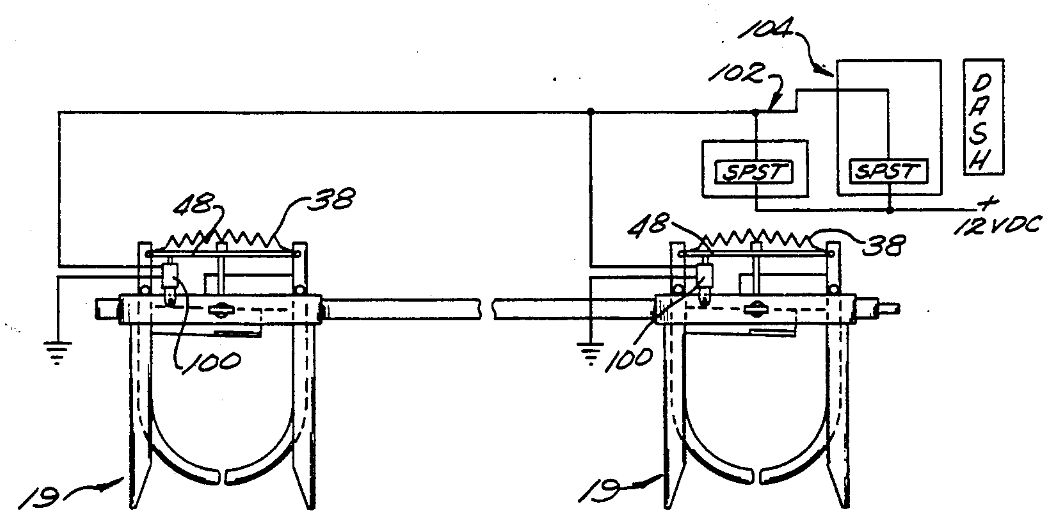
FIGS. 11 and 12 are top views of alternate embodiments with portions shown schematically.

The system, as shown in FIGS. 1-10, is releaseable by means of a simple, mechanical mechanism both at the wheelchair station and remotely at the driver's station however it can easily be adapted to be releaseable electrically with automatic safety provisions. As seen in FIG. 11, the pull cord has been replaced with solenoids 100 which are coupled to controls 102, 104 connected in parallel. Control 102 is disposed adjacent the restraining or wheelchair station while control 104 is placed adjacent the driver's station, as at the dashboard, for use by the vehicle operator. Controls 102, 104 each contain a suitable switch such as a single pole, single throw type to energize the solenoids and move latch 48 to the disengaged position allowing springs 38 to open the pincer elements 19. The solenoids have internal return springs to return them to their at rest withdrawn condition when deenergized.

Figure 12:
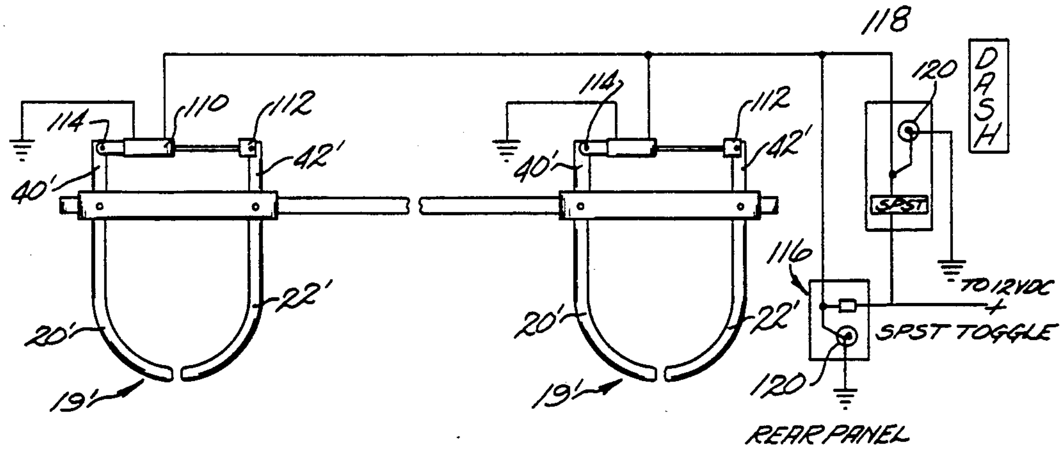

FIG. 12 shows a system in which the pincer elements 19' are provided with normally extended solenoids 110 whose armatures are pivotably connected to portion 42' of pincer element 22' at 112. The solenoids 110 are pivotably connected to portion 40', preferably through a pull pin 114 which can be manually pulled out in the event of an electrical malfunction. Parallel controls 116, 118 are provided at the wheelchair station and the driver's station to permit actuation from either location. Warning lights 120 may conveniently be provided to show an open pair of pincer elements, that is, a solenoid which is in the energized condition. In this system the pincer elements are normally closed and the solenoids have to be energized to allow a wheelchair to be rolled into the securable position.

It is obvious that many modifications are possible which come within the purview of the invention. For example, brackets 24 could be adjusted laterally by means of a screw motor or the like. Further, door switches could be coupled to the electrical system to provide a warning light or to prevent vehicle operation when the pincer elements are in the open position.

Although the invention has been described with respect to specific preferred embodiments thereof, variations and modifications will become apparent to those skilled in the art. It is therefore the intention that the appended claims be inerpreted as broadly as possible in view of the prior art to include all such variations and modifications.

We claim:

1. A wheelchair restraining system for securing and selectively releasing a wheelchair in a vehicle comprising:

a support means, first and second pairs of pincer elements mounted on the support means, the pincer elements of each pair movable relative to each other between a first open position and a second closed position, the pincer elements defining a space when in the closed position, means for moving the pincer elements into the closed position including an arm extending from each pincer element of a pair toward the other pincer element of the respective pair and being adapted to be engaged by a wheel placed between the pincer elements with the pincer elements being movable by the wheel toward a closed position whereby a wheel placed between the pincer elements will be secured, the arms in the closed position each having a surface overlapping and lying on each other and being movable in the same plane whereby a wheel placed between the pincer elements will engage one arm moving it which in turn moves the other arm to close the pincer elements and means for selectively moving the pincer elements into the open position to release the wheel.

2. A wheelchair restraining system according to claim 1, further including means for guiding wheels of a wheelchair between the pincer elements of each of the first and second pairs.

3. A wheelchair restraining system according to claim 2 in which the means for guiding wheels comprises for each pair of pincer elements a pair of rails extending parallel to one another from the support means and being aligned with each respective pair of pincer elements.

4. A wheelchair restraining system according to claim 3 in which the support means comprises a first bracket for the first pair of pincer elements and a second bracket for the second pair of pincer elements, each pair of pincer elements being pivotally mounted to its respective bracket intermediate their ends, and the rails extend from the brackets.

5. A wheelchair restraining system according to claim 4 in which stop members are provided on each bracket to limit motion of the pincer elements and maintain the pincer elements in a selected aligned position.

6. A wheelchair restraining system according to claim 4 in which the guide rails are positioned above the pincer elements.

7. A wheelchair restraining system according to claim 4 in which the guide rails are positioned below the pincer elements.

8. A wheelchair restraining system according to claim 4 in which the guide rails have outer distal free end portions which are outwardly flared to facilitate entry of said wheels therebetween.

9. A wheelchair restraining system according to claim 1 in which the support means comprises a first bracket for the first pair of pincer elements and a second bracket for the second pair of pincer elements, each pair of pincer elements being pivotably mounted to its respective bracket intermediate their ends, the pincer elements each having a first end coupled to a spring means urging the first ends of the pincer elements together, the pincer elements having a main body portion and a second opposite end which have a free distal end which are offset from the main body portion and extend toward one another.

10. A wheelchair restraining system according to claim 9, further including a latch member pivotably connected to the first end of one of each pair of pincer elements and having a free distal end adapted to move against the other pincer element limiting movement of the first ends of the pincer elements toward one another.

11. A wheelchair restraining system according to claim 10 in which a cord is attached to the free distal end of the latch member to selectively move the latch member away from the other pincer element to permit the spring means to move the pincer elements to the open position.

12. A wheelchair restraining system according to claim 10, further including a solenoid placed adjacent the free distal end of the latch member and including means to actuate the solenoid to dislodge the free distal end of the latch member from the other pincer element to permit the spring means to move the pincer elements to the open position.

13. A wheelchair restraining system according to claim 1 in which the support means includes a bracket for each pair of pincers, a respective pair of pincer elements is pivotably mounted to its respective bracket, the support means also comprising a transversely extending bar, the brackets slidably mounted on the bar and movable transversely to a selected position to accommodate wheelchairs having different lateral spacing between wheels, and means to lock the brackets to the bar at the selected position.

14. A wheelchair restraining system for securing wheelchairs in a vehicle comprising a transversely extending support means mounted in the vehicle, the support means including a bar and first and second brackets mounted on the bar in selectively adjusted transverse positions, a pair of pincer elements each having first and second ends pivotably mounted on each bracket intermediate the ends of the pincer elements, the pincer elements having a generally straight body portion spaced apart each from the other a selected distance and having distal end portions extending inwardly toward each other at the second ends, the pincer elements being movable between an open position with the second distal end portions separated and a closed position with the second distal end portions adjacent one another, an arm extending transversely from each pincer element of a pair toward the other pincer element of the pair, the arms spaced a selected distance from the second end portion, at least one of the arms being adapted to be engaged by a wheel placed between the pincer elements and to transfer a force from said wheel to the pincer element in a direction to move said pincer element toward the closed position, a latch member pivotably connected to the first end of one pincer element of each pair and having a free end movable toward the first end of the other pincer element of the pair to limit motion of the first ends toward each other and means to move the free end of the latch member away from the first end of the other pincer element of the pair and means to move the first ends of the pincer elements toward each other when the latch member is moved away from the first end of the other pincer element.

* * * * *